United States Patent [19]

Leutner et al.

[11] Patent Number: 5,077,023

[45] Date of Patent: Dec. 31, 1991

[54] REDUCTION IN THE RATE OF OXIDATION OF SULFITE SOLUTIONS

[75] Inventors: Bernd Leutner, Frankenthal; Klaus-Dieter Hoppe, Wachenheim; Paul Bever; Matthias Kraume, both of Mannheim, all of Fed. Rep. of Germany

[73] Assignee: BASF Aktiengesellschaft, Ludwigshafen, Fed. Rep. of Germany

[21] Appl. No.: 551,777

[22] Filed: Jul. 12, 1990

[51] Int. Cl.$^5$ .................. C01B 17/00; C01B 17/45
[52] U.S. Cl. ...................... 423/242; 423/512 A
[58] Field of Search ........... 423/242 A, 242 R, 512 A

[56] References Cited

U.S. PATENT DOCUMENTS

| | | | |
|---|---|---|---|
| 3,888,969 | 6/1975 | Kawamoto et al. | 423/243 |
| 4,310,438 | 1/1982 | Steelhammer et al. | 423/242 |
| 4,342,733 | 8/1982 | Steelhammer et al. | 423/242 |
| 4,348,289 | 9/1982 | Snavely et al. | 423/242 |
| 4,409,192 | 10/1983 | Lichtner et al. | 423/242 |
| 4,469,663 | 9/1984 | Crump et al. | 423/242 |
| 4,670,236 | 6/1987 | Thomas et al. | 423/242 |
| 4,818,506 | 4/1989 | Lin et al. | 423/242 |
| 4,834,955 | 5/1989 | Mouche et al. | 423/242 |

FOREIGN PATENT DOCUMENTS 0056180  7/1982  European Pat. Off. .

OTHER PUBLICATIONS

"Envirogenics Company, The Development of New and/or Improved Aqueous Processes... Final", Report vol. II, pp. 7 and 12.
Gmelins Handbuch der Anorganischen Chemie, 1963, System No. 9, pp. 1481–1501.

*Primary Examiner*—Gregory A. Heller
*Attorney, Agent, or Firm*—Keil & Weinkauf

[57] ABSTRACT

The rates of oxidation of sulfite/bisulfite-containing solutions in gas-liquid scrubbers for removing $SO_2$ from gases are reduced by adding oxidation inhibitors to the solutions in an amount of from 0.02 to 20 mmol per hour and per square meter of exchange area.

9 Claims, 1 Drawing Sheet

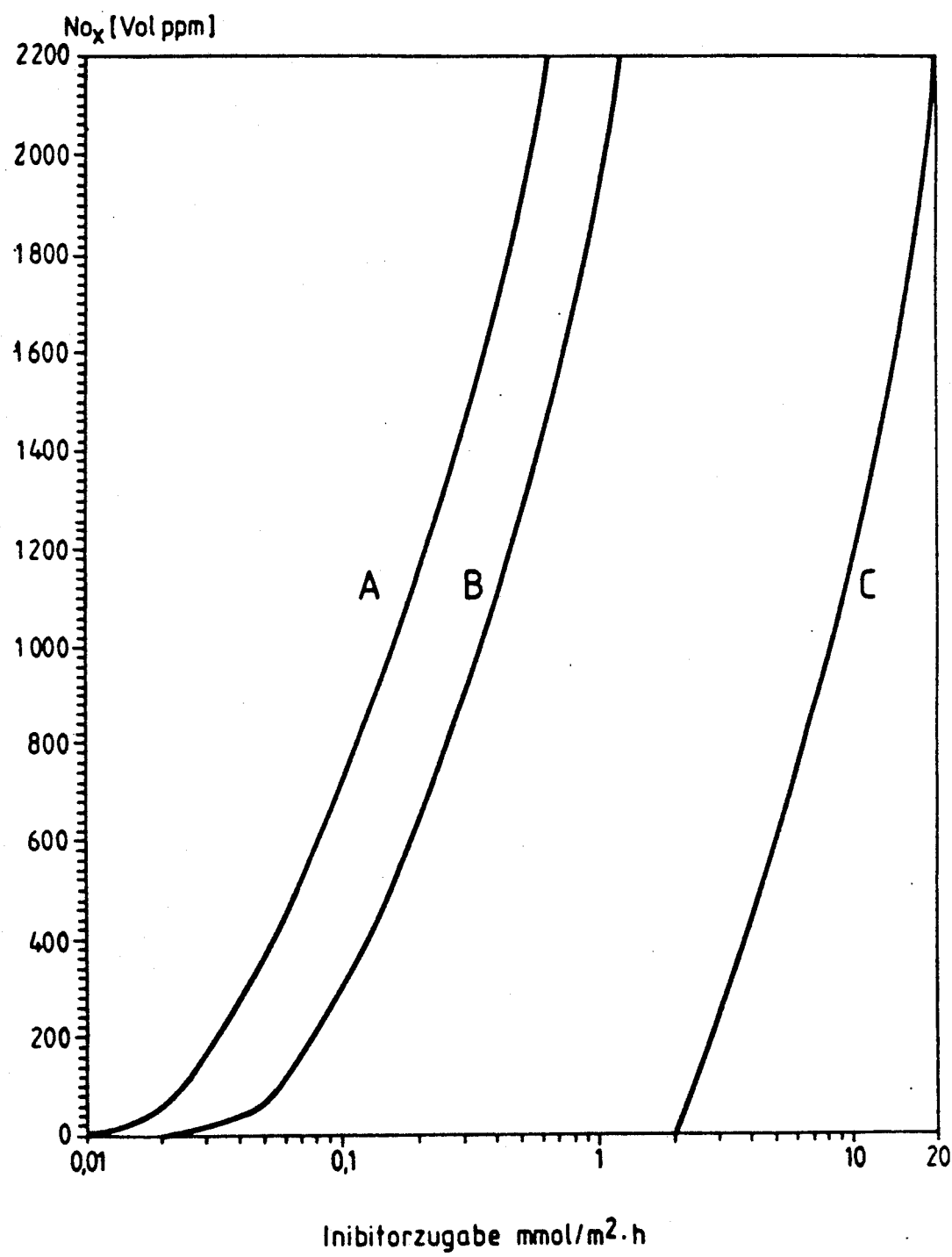

REDUCTION IN THE RATE OF OXIDATION OF SULFITE SOLUTIONS

The present invention relates to a process for reducing the rate of oxidation of sulfite-containing solutions, inter alia in flue gas desulfurization systems, in the presence of oxidation inhibitors.

Wet scrubbing is widely employed to remove sulfur dioxide from gases. These washes contain various chemicals which are able to bind the $SO_2$. Calcium hydroxide or calcium carbonate is predominantly employed to bind $SO_2$ in flue gas desulfurization systems in power stations The resultant reaction products, calcium sulfite or calcium sulfate, must be removed from the scrubber solution. The sale or even the disposal of these products has proved to be extremely difficult because of the large amounts produced, which are estimated in the Federal Republic of Germany alone to be more than three million tonnes a year.

Thus the processes used for flue gas desulfurization in order to avoid such disposal problems entail, where the sites are suitable, scrubbing the $SO_2$-containing waste gases with aqueous alkali metal sulfite solutions. The latter react with the gaseous sulfur dioxide to form alkali metal bisulfite The absorbed sulfur dioxide can be driven out of the solutions, and the alkali metal sulfite be recovered, by simply heating the alkali metal bisulfite solution. The concentrated sulfur dioxide gas resulting from this is converted into useful products such as sulfuric acid.

Although no disposal problems ought to occur with these processes and similar ones, including those based on oxides of magnesium and zinc, in contrast to the abovementioned scrubbing processes based on calcium compounds, weak points have emerged on use on the industrial scale. This is because side reactions occurring during absorption of sulfur dioxide result in the formation of considerable amounts of sulfate. Formation of sulfate is attributable to the oxygen which is present in the waste gases to be treated, and which reacts with the sulfites and bisulfites in an undesired manner to give the corresponding sulfates. Thus, in order to avoid an undesired increase in the concentration of alkali metal sulfate in the sulfite-containing scrubber solution, this salt must be removed from the absorption cycle. It has emerged during operation of flue gas scrubbers installed recently that the rates of oxidation of alkali metal sulfite to sulfate, eg. of sodium sulfite to sodium sulfate, are relatively high, and thus that the sodium sulfate which is produced in relatively large quantity must be regarded as an extremely troublesome byproduct Many disadvantages derive from the unavoidable production of sodium sulfate On the one hand, the equipment for removing the quantities of sodium sulfate must be correspondingly large and thus cost-intensive. On the other hand, the removal of sodium sulfate is associated with a loss of useful sulfur dioxide and of the valuable sodium hydroxide solution employed as raw material. The further use of sodium sulfate proves to be another problem. There has been a continuous decrease in the prospects of selling sodium sulfate profitably, so that it now appears virtually impossible to market this product, at least in central Europe. Disposal of the readily water-soluble salt is unacceptable both for environmental protection reasons and from the viewpoint of economics.

The problems when oxides of magnesium or zinc are used derive from the regeneration of the corresponding metal sulfates which are the products of reaction with water and the $SO_2$-containing waste gases and are present in the aqueous phase. Thus, the desulfurization with magnesium oxide which is used in some flue gas systems in the USA requires removal of the magnesium sulfate which is formed, and subsequent costly reductive cleavage of the dried salt with carbon or carbon compounds above 500° C.

Various methods are known for reducing the undesired sulfite oxidation.

Thus, for example, complexing agents can be added to the sulfite-containing absorption solutions. The complexing agents are able to sequester and thus inactivate the heavy metals which catalyze the oxidation (cf. C. A. Eckert et al., J. Phys. Chem. 86 (1982) 4233–4237). Examples of heavy metals which increase the rate of sulfite oxidation particularly greatly and display this effect even at concentrations below 1 ppm are cobalt and copper. However, it is of course beneficial to add complexing agents only when the absorption solutions contain metals with catalytic activity If these are virtually absent, for example because the components of the flue gas desulfurization systems are mainly composed of corrosion-resistant materials, eg. plastics, and hardly any heavy metals are introduced via the fly ash or from other sources, the effect displayed by addition of complexing agent is only small or non-existent.

Another way of reducing the sulfate formation rate is to add oxidation inhibitors. This method of stabilizing sulfite solutions from oxidation by atmospheric oxygen has been known for a long time. Among the compounds mentioned in the literature for this purpose are aromatic (poly)amines, aromatic (poly)hydroxy compounds and polyalcohols. A detailed list of inhibitors which have been investigated and act in a variety of ways is to be found in Gmelins Handbuch der Anorganischen Chemie, 8th edition, 1963, system no. 9, sulfur, part B, instalment 3, pages 1481–1501.

U.S. Pat. No. 3,888,969 describes specific substituted phenols as oxidation inhibitors for aqueous solutions of sodium/potassium sulfite/bisulfite, which are said to be more effective than the oxidation inhibitors of the prior art, such as hydroquinone and the like.

European Patent 0,056,180 recommends the addition of a phosphorus-containing, water-soluble topping agent in addition to oxidation inhibitors in order to improve the action of the latter. These topping agents comprise substances from the group consisting of polyphosphates, organophosphorus acids and oligomers of these compounds and mixtures thereof. Addition of these topping agents is said to be particularly effective when the aqueous scrubber solution contains solids, eg. fly ash, which is always the case in the treatment of flue gases.

However, the action of the oxidation inhibitors is greatly impaired, if not completely cancelled out, by other gaseous compounds present in the gases to be treated. These compounds are, in particular, nitrogen 15 oxides which are always present in the form of NO and $NO_2$ (called $NO_x$ hereinafter) in greater or lesser quantities in the flue gases from combustion systems. A detailed study was carried out by the Aerojet-general Corporation, El Monte, California, and it is stated in "The development of new and/or improved aqueous processes for removing $SO_2$ from flue gases", Final Report, volume II, October 1970, that $NO_x$, and in particular $NO_2$ are the main reasons for sulfite oxidation (pages 7 and 12 of this report) and that the latter totally suppressed the action of oxidation inhibitors. It is stated that the oxidation rate is lowered only when nitrilotriacetic acid is used as oxidation inhibitor, and this only in sulfite/bisulfite solutions of pH 12.6 or above. However, this high pH is impracticable for operation of a flue gas scrubber because carbon dioxide is then also absorbed.

Thus, to date no process with which it is possible to reduce the rate of oxidation of sulfite/bisulfite solutions when $NO_x$ is present in the waste gases to be treated has been disclosed.

Hence it is an object of the present invention to provide a process for reducing the rates of oxidation of sulfite/bisulfite-containing solutions in gas-liquid scrubbers for removing $SO_2$ from gases with the addition of oxidation inhibitors, in which the abovementioned disadvantages do not occur and which is suitable, in particular, for reducing the rate of oxidation of sulfite/bisulfite solutions on treatment of gases which contain $NO_x$ in addition to $SO_2$.

We have found that this object is achieved by adding 0.01 to 20 mmol of oxidation inhibitors to the sulfite/bisulfite-containing solutions per square meter of exchange area between gas and liquid and per hour.

The oxidation inhibitor is expediently added in dissolved form to the sulfite/bisulfite-containing solution before entry into the gas/liquid scrubber The solvent which is preferably employed is water as long as the oxidation inhibitor is soluble therein. However, alcohols can also be employed as solvent if necessary. Likewise, when organic amines are employed, it is possible to use mineral acids, eg. sulfuric acid, to increase solubility. Highly concentrated inhibitor solutions are employed in order to avoid excessive dilution of the absorption liquid. It is expedient to add the oxidation inhibitor to the absorption solution continuously or at short intervals in order to keep the concentration of the oxidation inhibitor in the absorption solution as nearly constant as possible. This is intended to ensure that the action of the oxidation inhibitor is as nearly constant as possible.

According to the present invention 0.01 to 20 mmol of oxidation inhibitor are added to the sulfite/bisulfite solution per hour and per square meter of exchange area. The exchange area in packed columns is defined as the surface area of the packing. In the case of scrubbers where the gas passes through the scrubber liquid in the form of bubbles, the exchange area is defined as the area of the interface between the liquid and the gas.

It is advantageous, in order to eliminate an increase in the oxidation rate by traces of metals, to add metal-complexing agents, such as polyaminopolycarboxylic acids or polyamino-(poly)phosphonic acids, to the scrubber liquids, specifically in a molar concentration which is at least equivalent to the molar concentration of all the interfering metal ions.

The amount of oxidation inhibitor to be metered in depends in each case on the $NO_x$ content of the gas which is to be treated, which is usually up to 2000 ppm by volume. When the $NO_x$ content is low, the oxidation inhibitor is employed in the lower part of the abovementioned range. The amount of inhibitor which it is expedient to employ is evident from the graph, in which the X axis is the amount of inhibitor to be added in mmol/$m^2$ of exchange area . h and the Y axis is the $NO_x$ concentration in the waste gas to be treated in ppm by volume. The amount of inhibitors to be employed for a particular $NO_x$ concentration is evident from the range defined by the intercepts on curves A and C by a straight line through the relevant $NO_x$ concentration and parallel to the X axis, preferably by the intercepts of this line on curves B and C.

It is advantageous, in order to reduce the amount of oxidation inhibitor used, to decrease the $NO_x$ content of the waste gas before it is treated with the sulfite/bisulfite solutions.

All conventional processes can be employed to reduce the $NO_x$ concentration. Thus, it is possible to lower the $NO_x$ content by primary measures during combustion, such as reducing the combustion temperature or stepwise combustion. It is furthermore possible to introduce, downstream of the flame at about 1000° C. or below, ammonia or N-containing compounds in order to lower the $NO_x$ content by this non-catalytic means. Another possibility is heterogeneous catalysis of $NO_x$ reduction with ammonia to give molecular nitrogen on fixed bed catalysts at from 300° to 400° C. Furthermore $NO_x$ can be removed below about 100° C. with solutions of iron(II) EDTA or other strong complexing agents for iron. The abbreviation EDTA stands for the complexing agent ethylenediaminetetraacetic acid.

All the known oxidation inhibitors can be employed.

Oxidation inhibitors which have proven particularly effective for the present purpose are aromatic polyamines, polyhydroxy compounds and (poly)amino/(poly)hydroxy compounds. Examples are: p-phenylenediamine, o-phenylenediamine, o-toluidine, hydroquinone and other dihydroxybenzenes, trihydroxybenzenes, gallic acid, 4-aminophenol, 4-methylaminophenol and N-(2-hydroxyethyl)aniline. It is of course also possible for these compounds to have other substituents, e.g. one or more alkyl, halogen or sulfo groups, as long the solubility in water is still sufficient.

Other effective oxidation inhibitors are ascorbic acid, erythorbic acid and dehydroascorbic acid, which do not belong to the classes of compounds listed above (cf. JP-A 80/109,210).

The process according to the invention is carried out at from 20° to 90° C., preferably from 40° to 70° C. It can be carried out under atmospheric or superatmospheric pressure The sulfite/bisulfite concentration can be from about 0.5% by weight to a saturated solution.

EXAMPLES

The following examples were carried out in a laboratory scrubber column comprising a 50 mm-diameter glass tube packed to a height of 100 cm with fabric (Sulzer BX, 500 $m^2/m^3$) with a contact area of 100 $dm^2$. A circulated scrubber liquid was passed downwards through this column at a flow rate of 7 l/h. A model flue gas was introduced at a flow rate of 1200l/h at the foot of the column flowing in the opposite direction to the scrubber liquid.

The 530 g of scrubber liquid had the following composition:
$Na_2SO_3$: 68 g/l
$NaHSO_3$: 100 g/l
$Na_2SO_4$: 85 g/l The pH was 6.0, which was kept constant by addition of small amounts of 25% by weight sodium hydroxide solution.

The composition of the flue gas was as follows:

$O_2$: 7% by vol.
$H_2O$: 8-9% by vol. at 45° C.
$NO_x$: 0-2000 ppm by vol. $NO_x$ was determined as NO in an infra-red spectrometer after the $NO_2$ in the gas had been completely converted into NO in a thermal converter in front of the IR cell.
$SO_2$: 1000 ppm by vol.
$NO_2$: remainder The oxidation inhibitors were dissolved in water, or in dilute sulfuric acid in the case of the amines, and metered continuously into the scrubber liquid.

EXAMPLES 1-26

The inhibitor employed in Examples 1-26 was ascorbic acid, except in comparative examples 1, 6, 12, 18 and 23 without inhibitor.

The oxidation rates indicated in the following table were calculated as follows:

$$\text{Percent oxidation} = \frac{\text{rate of sulfate formation in the example}}{\text{rate of sulfate formation in the relevant example without inhibitor}} \times 100$$

| | Example No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $NO_x$ conc. in ppm by vol. | 100 | 100 | 100 | 100 | 100 | 300 | 300 | 300 | 300 | 300 | 300 | 550 | 550 | 550 |
| Inhibitor dosage in mmol/m² · h | 0 | 0.1 | 0.25 | 0.5 | 1.0 | 0 | 0.1 | 0.25 | 0.5 | 1.0 | 2 | 0 | 0.25 | 0.5 |
| Rate of sulfate formation in g/h | 1.7 | 1.3 | 0.5 | 0.1 | 0.05 | 4 | 2.8 | 1.5 | 0.7 | 0.6 | 0.5 | 5 | 4.2 | 3.7 |
| % oxidation | 100 | 76.5 | 29 | 6 | 3 | 100 | 70 | 37.5 | 27.5 | 15 | 12 | 100 | 84 | 74 |
| Inhibitor conc. % by wt. | — | 0.68 | 0.68 | 0.68 | 0.68 | — | 0.68 | 0.68 | 0.68 | 0.68 | 0.68 | — | 1.7 | 1.7 |

| | Example No. | | | | | | | | | | | |
|---|---|---|---|---|---|---|---|---|---|---|---|---|
| | 15 | 16 | 17 | 18 | 19 | 20 | 21 | 22 | 23 | 24 | 25 | 26 |
| $NO_x$ conc. in ppm by vol. | 550 | 550 | 550 | 1000 | 1000 | 1000 | 1000 | 1000 | 2000 | 2000 | 2000 | 2000 |
| Inhibitor dosage in mmol/m² · h | 1 | 2 | 4 | 0 | 0.5 | 1 | 2 | 4 | 0 | 1.5 | 3 | 6 |
| Rate of sulfate formation in g/h | 1.3 | 0.6 | 0.1 | 6.3 | 5 | 3.5 | 1.5 | 0.1 | 8 | 5.6 | 3.2 | 1.4 |
| % oxidation | 26 | 12 | 2 | 100 | 79 | 56 | 24 | 2 | 100 | 70 | 40 | 17.5 |
| Inhibitor conc. % by wt. | 1.7 | 1.7 | 1.7 | — | 3.4 | 3.4 | 3.4 | 3.4 | — | 10.2 | 10.2 | 10.2 |

EXAMPLES 27-32

The inhibitor employed in Examples 27-32, with the exception of Examples 27 and 30 without inhibitor, was p-phenylenediamine.

| | Example No. | | | | | |
|---|---|---|---|---|---|---|
| | 27 | 28 | 29 | 30 | 31 | 32 |
| $NO_x$ conc. in ppm by vol. | 100 | 100 | 100 | 550 | 550 | 550 |
| Inhibitor dosage in mmol/m² · h | 0 | 0.2 | 0.5 | 0 | 0.5 | 1 |
| Rate of sulfate formation in g/h | 2.7 | 1.6 | 0.7 | 3.6 | 2.9 | 1.7 |
| % oxidation | 100 | 60 | 26 | 100 | 81 | 47 |
| Inhibitor conc. % by wt. | — | 2.1 | 2.1 | — | 4.3 | 4.3 |

EXAMPLES 33-38

The inhibitor employed in Examples 33-38, with the exception of Examples 33 and 36 without inhibitor, was p-methylaminophenol as its sulfate

| | Example No. | | | | | |
|---|---|---|---|---|---|---|
| | 33 | 34 | 35 | 36 | 37 | 38 |
| $NO_x$ conc. in ppm by vol. | 100 | 100 | 550 | 550 | 550 | 550 |
| Inhibitor dosage in mmol/m² · h | 0 | 0.1 | 0.4 | 0 | 0.5 | 1 |
| Rate of sulfate formation in g/h | 2.8 | 0.7 | 0.4 | 6 | 1.1 | 0.7 |
| % oxidation | 100 | 25 | 14 | 100 | 18 | 12 |
| Inhibitor | — | 2.72 | 2.72 | — | 2.72 | 2.72 |

| | -continued | | | | | |
|---|---|---|---|---|---|---|
| | Example No. | | | | | |
| | 33 | 34 | 35 | 36 | 37 | 38 |
| conc. % by wt. | | | | | | |

EXAMPLES 39–45

Effect of continuous addition of inhibitor in the absence of $NO_x$ a) Examples 39 and 40 with ascorbic acid
b) Examples 41 to 43 with methylaminophenol
c) Examples 44 to 45 with p-phenylenediamine

| | Example No. | | | | | | |
|---|---|---|---|---|---|---|---|
| | 39 | 40 | 41 | 42 | 43 | 44 | 45 |
| $NO_x$ conc. in ppm by vol. | 0 | 0 | 0 | 0 | 0 | 0 | 0 |
| Inhibitor dosage in mmol/m²·h | 0 | 0.05 | 0 | 0.025 | 0.05 | 0 | 0.1 |
| Rate of sulfate formation in g/h | 0.6 | 0.4 | 0.9 | 0.6 | 0.5 | 0.5 | 0.4 |
| % oxidation | 100 | 67 | 100 | 66 | 56 | 100 | 80 |
| Inhibitor conc. % by wt. | — | 1.36 | — | 1.72 | 1.72 | — | 1.1 |

We claim:

1. A process for reducing the rates of oxidation of sulfite/bisulfite-containing solutions in gas-liquid scrubbers for removing $SO_2$ from gases with the addition of oxidation inhibitors, which comprises adding 0.01 to 20 mmol of oxidation inhibitors to the sulfite/bisulfite-containing solutions per square meter of exchange area between gas and liquid and per hour.

2. A process as claimed in claim 1, wherein the oxidation inhibitors are added continuously.

3. A process as claimed in claim 1, wherein complexing agents for metals are added in addition to the oxidation inhibitors.

4. A process as claimed in claim 1, wherein the oxidation inhibitor is added to the sulfite/bisulfite-containing solutions in amounts which are dependent on the $NO_x$ content of the gas and which are indicated by the range defined on the FIGURE by the intercepts of a line, which is drawn through the $NO_x$ content on the ordinate and parallel to the abscissa, on curves A and C.

5. The process of claim 1 wherein the $SO_2$-containing gas also contains $NO_x$.

6. A process as claimed in claim 5, wherein the $NO_x$ content of the gas is reduced before removal of the $SO_2$.

7. The process of claim 1, wherein the oxidation inhibitor is a member selected from the group consisting of aromatic polyamines, polyhydroxy compounds, and mixtures thereof.

8. The process of claim 1, wherein the oxidation inhibitor is a member selected from the group consisting of ascorbic acid, dehydroascorbic acid, and mixtures thereof.

9. The process of claim 1, wherein the oxidation inhibitor is added to the sulfite/bisulfite-containing solutions in amounts which are dependent on the $NO_x$ content of the gas and which are indicated by the range defined on the FIGURE by the intercepts of a line, which is drawn through the $NO_x$ content on the ordinate and parallel to the abscissa, on curves B and C.

* * * * *

UNITED STATES PATENT AND TRADEMARK OFFICE
CERTIFICATE OF CORRECTION

PATENT NO. : 5,077,023

DATED : Dec. 31, 1991

INVENTOR(S) : Leutner et al.

It is certified that error appears in the above-identified patent and that said Letters Patent is hereby corrected as shown below:

On the title page:

Insert Foreign Application Priority Data --Aug. 1, 1989 (DE)

Fed. Rep. of Germany ..... 3925424--.

Signed and Sealed this

Twenty-seventh Day of April, 1993

*Attest:*

MICHAEL K. KIRK

*Attesting Officer*      *Acting Commissioner of Patents and Trademarks*